United States Patent [19]

Shimizu

[11] Patent Number: 5,247,875
[45] Date of Patent: Sep. 28, 1993

[54] COMPACT VERTICAL U-SHAPED PAN FOOD FRYING MACHINE

[75] Inventor: Yasuhiro Shimizu, Isehara, Japan

[73] Assignee: Toshin Technical Co., Ltd., Kanagawa, Japan

[21] Appl. No.: 902,139

[22] Filed: Jun. 22, 1992

Related U.S. Application Data

[63] Continuation-in-part of Ser. No. 687,193, Apr. 18, 1991, abandoned, which is a continuation of Ser. No. 512,613, Apr. 12, 1990, abandoned, which is a continuation of Ser. No. 322,742, Mar. 13, 1989, abandoned.

[30] Foreign Application Priority Data

Dec. 12, 1988 [JP] Japan .................. 63-313502

[51] Int. Cl.$^5$ .......................................... A47J 37/12
[52] U.S. Cl. ........................................ 99/404; 99/407; 99/443 C
[58] Field of Search ............... 99/402, 403, 404, 405, 99/406, 407, 409, 410, 416, 443 C

[56] References Cited

U.S. PATENT DOCUMENTS

| | | | |
|---|---|---|---|
| 1,159,537 | 11/1915 | Shields | 99/404 |
| 1,414,713 | 5/1922 | Sherman et al. | 99/405 |
| 1,926,313 | 9/1933 | Smith | 99/404 X |
| 2,112,309 | 3/1938 | Santillan | 99/353 X |
| 2,207,316 | 7/1940 | Ferry | 99/405 X |
| 2,249,792 | 7/1941 | Skinner | 99/404 X |
| 2,319,561 | 5/1943 | Scharsch | 99/404 |
| 2,418,519 | 4/1947 | McBeth | 99/404 |
| 2,463,112 | 3/1949 | Kipnis | 99/404 |
| 2,696,766 | 12/1954 | McBean et al. | 99/404 |
| 2,833,204 | 5/1958 | Kipnis | 99/405 |
| 2,853,937 | 9/1958 | Peck | 99/404 |
| 2,926,597 | 3/1960 | Porambo | 99/405 X |
| 3,132,949 | 5/1964 | Crowe | 99/405 X |
| 3,340,792 | 9/1967 | Matzke | 99/405 |
| 3,391,634 | 7/1968 | Williams | 99/405 |
| 3,585,923 | 6/1971 | Waller | 99/404 X |
| 3,626,466 | 12/1971 | Liepa | 99/353 |
| 3,637,401 | 1/1972 | Kuhlman | 99/404 X |
| 3,641,923 | 2/1972 | Wilkinson | 99/404 |
| 3,711,304 | 1/1973 | Hawley | 99/404 X |
| 3,722,400 | 3/1973 | Jimenez | 99/404 X |
| 3,761,290 | 9/1973 | Brunner | 99/404 X |
| 3,766,846 | 10/1973 | Jimenez | 99/404 X |
| 4,106,400 | 8/1978 | Noel | 99/423 X |
| 4,187,771 | 2/1980 | Westover | 99/404 |
| 4,571,341 | 2/1986 | Sugimura | 99/443 C U X |
| 4,685,386 | 8/1987 | Rezon | 99/443 C X |
| 4,694,742 | 9/1987 | Dover | 99/404 |
| 4,706,557 | 11/1987 | Feng | 99/405 X |
| 4,744,293 | 5/1988 | Shimokawa | 99/406 X |

FOREIGN PATENT DOCUMENTS

| | | | |
|---|---|---|---|
| 149424 | 4/1951 | Australia | 99/404 |
| 1429995 | 4/1969 | Fed. Rep. of Germany | 99/404 |
| 2003299 | 9/1971 | Fed. Rep. of Germany | 99/407 |
| 2387607 | 12/1978 | France | 99/470 |
| 4939827 | 10/1974 | Japan . | |
| 69386 | 6/1945 | Netherlands | 99/405 |
| 80076 | 1/1951 | Netherlands | 99/443 C |
| 434630 | 10/1967 | Switzerland | 99/405 |
| 331831 | 7/1930 | United Kingdom | 99/404 |

Primary Examiner—Timothy F. Simone
Assistant Examiner—Charles Cooley
Attorney, Agent, or Firm—Guy W. Shoup; Norman R. Klivans

[57] ABSTRACT

A compact food frying machine having a vertically-oriented U-shaped pan for holding a heated liquid, an endless belt for carrying food items, multiple guiding elements spaced along the length of the belt, each including a number of parallel slats spaced adjacent to each other along the width of the belt, a feeding position, and an unloading position directly above the feeding position, and a guide member projecting and sloping up from the unloading position into the region where the guiding elements pass by, for allowing the slats of the guiding elements to pass through the guide member in an intermeshing relationship but retaining and guiding the food item to the unloading position after the food item has been carried through the heated liquid by the endless belt.

2 Claims, 4 Drawing Sheets

COMPACT VERTICAL U-SHAPED PAN FOOD FRYING MACHINE

CROSS-REFERENCE TO RELATED APPLICATION

This application is a continuation-in-part of U.S. patent application Ser. No. 07/687,193, Apr. 18, 1991, abandoned, which is a continuation of U.S. patent application Ser. No. 07/512,613, Apr. 12, 1990, abandoned, which is a continuation of U.S. patent application Ser. No. 07/322,742, Mar. 13, 1989, abandoned.

BACKGROUND OF THE INVENTION

1. Field of the Invention

This invention relates to a food frying machine and more particularly to a food processing machine in which a food is fried under a meshed belt in a food oil so as to safely guide the food.

2. Related Art Statement

For the conventionally employed food frying machine, there are so far proposed a variety of constructions, as typified by the construction shown in FIG. 1 of the Japanese Patent Publication 49-39827, as shown in FIG. 1.

Referring now to FIG. 1, the numeral 20 is a stationary mesh, and the numeral 21 is a movable mesh, food is moved by said movable mesh 21, and floating of said food is prevented by said stationary mesh 20.

Further, as to the construction of Japanese Patent Publication 49-39827, a carrier of L-shape is mounted to a chain, and food is carried by said L-shaped carrier.

In the above-described food frying machine, the following problems were presented.

Since said stationary mesh 20 for preventing floating of the food in a food oil is of a stationary construction, a movement of the fried food is not smoothly carried out, whereby a shape of the fried food is changed and manufacturing efficiency becomes worse.

Further, even if said mesh belt is an endless type, the food is transported to the other side which is an opposite side of a food feeding side, since a half of said mesh belt is immersed in a food oil, and the food is not returned to the food feeding side.

Furthermore, this device is not able to perform a drying of the oil on the food since the time in which the food is out of the oil is very short.

OBJECT AND SUMMARY OF THE INVENTION

In view of these drawbacks of the prior art device, it is a principal object of the present invention to provide a food frying machine in which a food is fried under a mesh belt in an oil so as to safely guide the food.

The food frying machine according to the present invention comprises an endless mesh belt which is rotatably mounted, a drive means for rotating said endless mesh belt, an oil pan in which a part of said endless belt is embedded in a food oil in said oil pan, whereby a food passes through said food oil under the condition of controlling floating of the food by an underside portion of said endless mesh belt.

The food frying machine of the present invention is able to continuously automatically fry a food, and a fried food is automatically returned to a food feeding side after the frying of said food, and a drying of said fried food is automatically performed, whereby a frying operation is performed by only one person, and space is conserved.

Further, a food is completely prevented from floating during the frying operation by an endless mesh belt, said endless mesh belt having two functions, as a food transport and preventing floating of the fried food, whereby a small size machine and an energy saving are attained.

EMBODIMENT OF THE INVENTION

Several embodiments of the food frying machine of the present invention will be hereafter explained by referring to the accompanying drawings.

Figure 1:
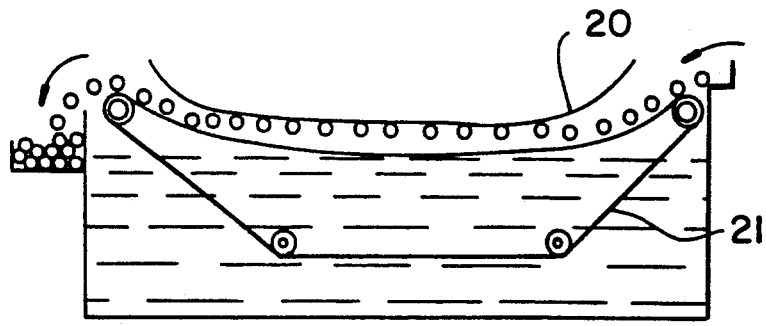
FIG. 1 is a side view of a food frying machine as in the prior art.
Figure 2:
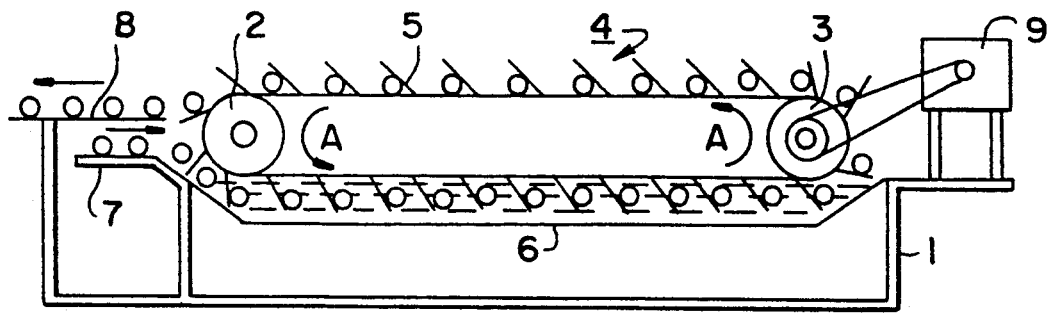
FIG. 2 is a side view of one embodiment of a food frying machine of the present invention.
Figure 3:
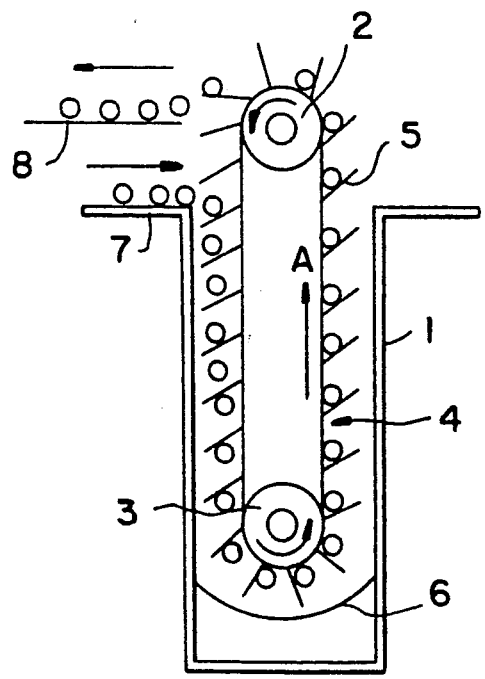
FIG. 3 is a side view of another embodiment of a food frying machine of the present invention.

FIGS. 2 and 3 both show a food frying machine according to the present invention; in both FIGURES the numeral 1 is an oil pan for holding a heated food oil, an endless mesh belt 4 is rotatably mounted to the rollers 2 and 3 which are supported by shafts (not shown), and a plurality of angled guide strips 5 are mounted to said endless mesh belt 4 with a certain spacing.

Further, a food reception member 6 is positioned under said belt 4 in said oil pan 1.

A food feeding side 7 is located adjacent to one end portion of said oil pan 1, a pulling out conveyor 8 is positioned over said food feeding side 7.

Further, the numeral 9 (not shown in FIG. 3) is a driving member such as a motor for said mesh belt 4, which is positioned over said oil pan 1.

Therefore, after said food oil in said oil pan 1 is heated until it becomes a preferable temperature, food is fed into said food feeding side 7 while said mesh belt 4 is rotated towards arrow mark "A" by said driving member, then said food is guided into said food oil by said guide strips 5.

At the start of said operating condition, said food is immersed in said food oil since said food is very heavy, however, when said food is heated and fried, said food is changed to a fried food and floats on said food oil in a position just under said mesh belt 4.

Further, when said mesh belt 4 is rotated, said fried food is sequentially lifted from said food oil by said guide strips 5.

Therefore, said fried food is carried by said mesh belt 4 towards said pulling out conveyor 8, whereby an oil drying of said fried food is performed.

Further, when said fried food is moved to a position near said food feeding side 7, said fried food is transported onto said pulling out conveyor 8 by said guide strips 5, whereby fried food from which the oil is dried is removed from said pulling out conveyor 8 sequentially.

Figure 4:
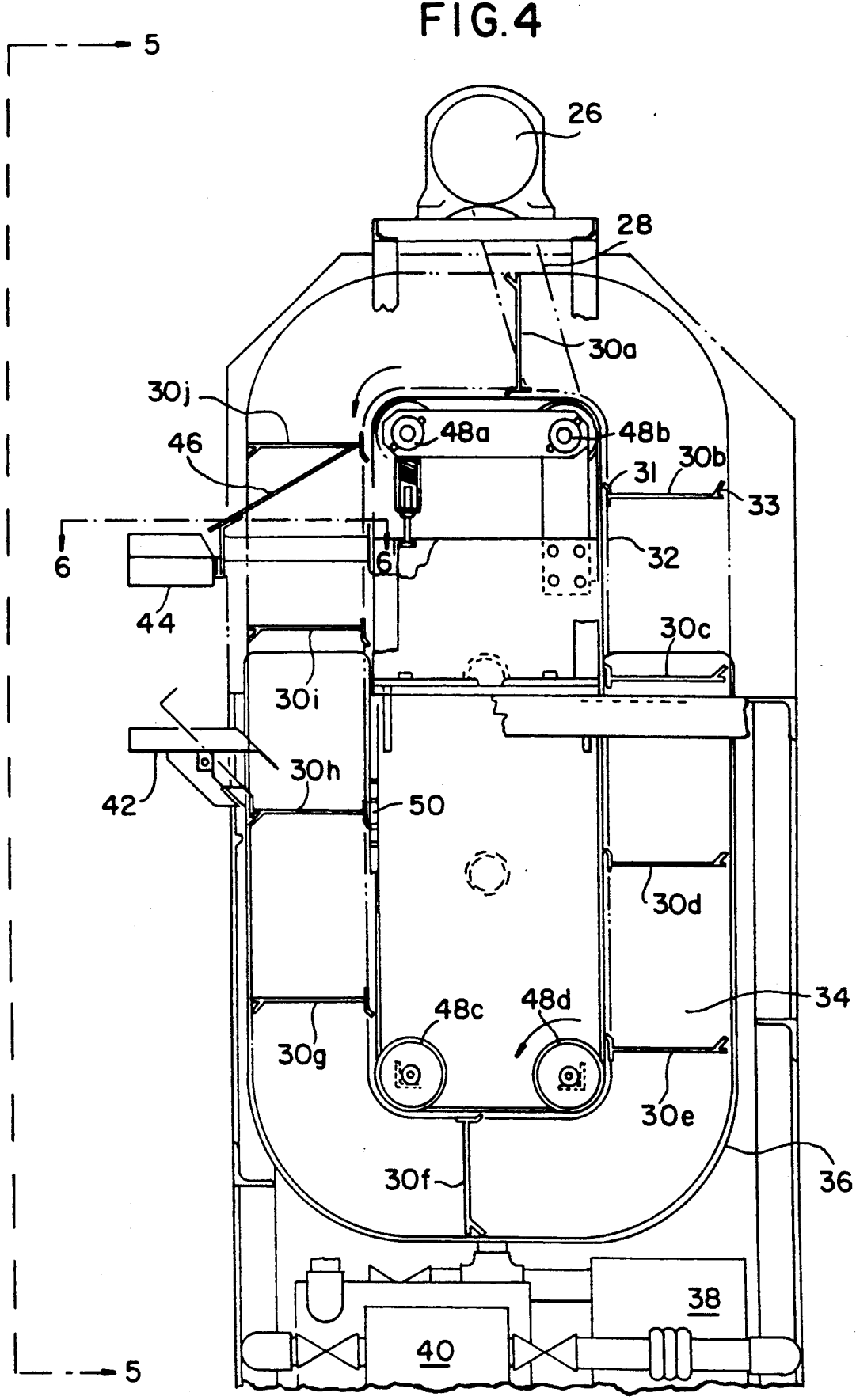
FIG. 4 is a side view of the food frying machine in accordance with the present invention showing the structure of the machine.

FIG. 4 shows additional features of a machine in accordance with the invention in a side view. As shown, motor 26 drives drive belt 28 connected between motor 26 and endless belt 32. Guide strips 30a, 30b, . . . , 30j are shown attached to endless belt 32 each by a bracket 31. Each guide strip e.g. 30b is comprised of a number of parallel slats with spaces (slots) in between to allow drainage of the oil (see FIG. 5), and has an end portion 33 for retaining the food items thereon. Guide strips 30a, 36b . . . 30j may be at right angle to, as shown in FIG. 4, or at an acute angle to the moving direction of endless belt 32 as shown in FIG. 3. Edible oil 34 for frying the food is held in the U-shaped pan 36 which has a vertical dimension substantially greater than horizontal dimensions thereof. As shown in FIG. 4, guide member 46 projects and slopes upwardly at take-out position 44 into the path where guide strips 30a, 30b, . . . 30j pass through and allows the slats of the guide strips to pass therethrough in a intermeshing relationship but retains the food item held on guide strips 30a, 30b . . . 30j and guides them to takeout position 44. The oil 34 is circulated through filter 38 by pump 40. The food items to be fried are fed in at feeding-portion 42 and taken out at take-out portion 44 via guide member 46. Endless belt 32 is driven by pulley wheels 48a, 48b, 48c, and 48d.

Also shown in FIG. 4 is partial detail 50 of the endless belt 32 showing how belt 32 is a chain structure consisting of alternating larger and smaller chain elements to allow the oil to drain through the belt.

Figure 5:
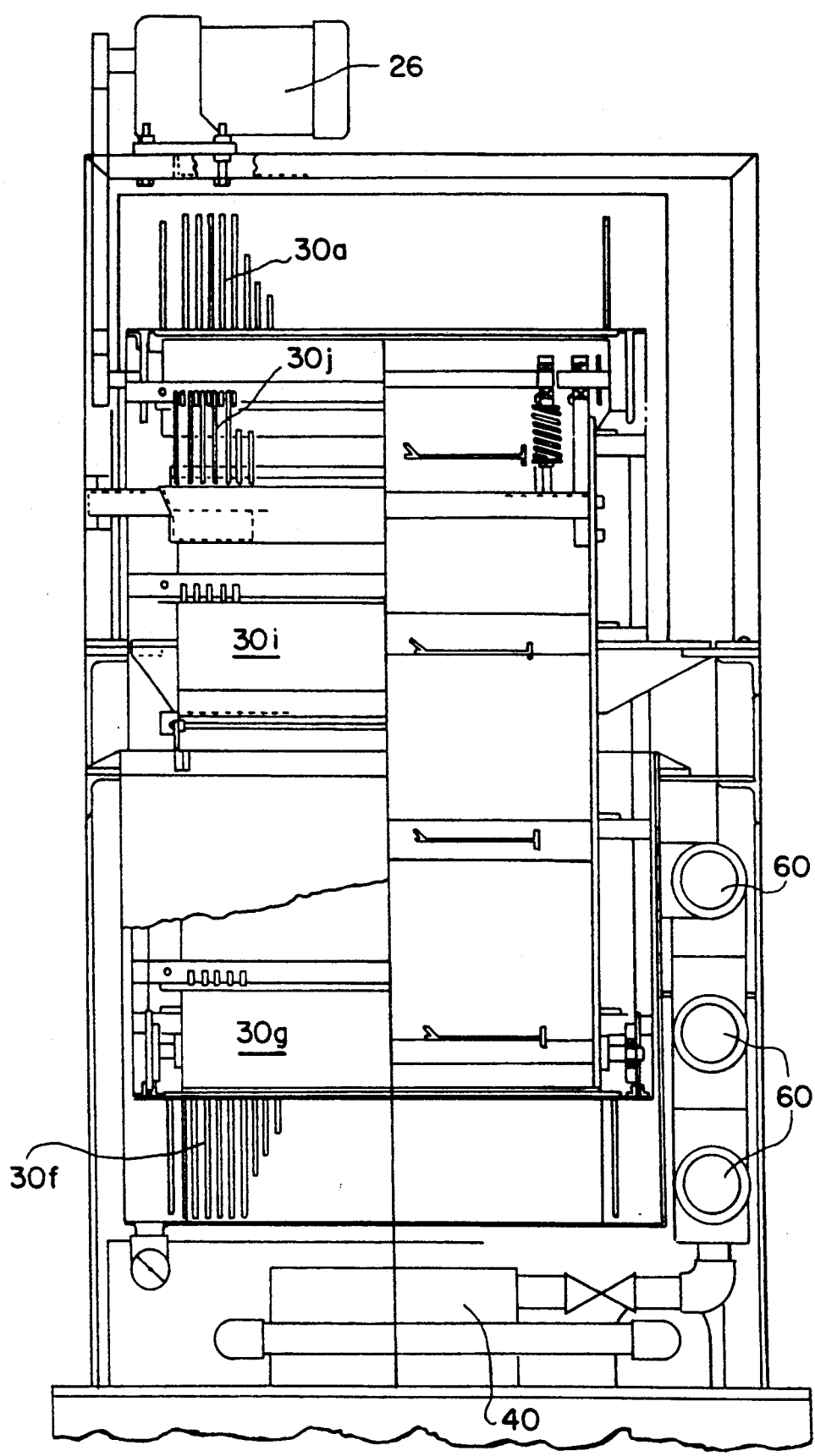
FIG. 5 is a side view of the FIG. 4 food frying machine viewed from the left as shown in the direction of 5—5 of FIG. 4.

FIG. 5 is a partial cross-sectional view through line 5—5 of FIG. 4 including many of the same elements as shown in FIG. 4. Also shown in FIG. 5 are heater elements 60 for heating the edible oil.

Figure 6A:
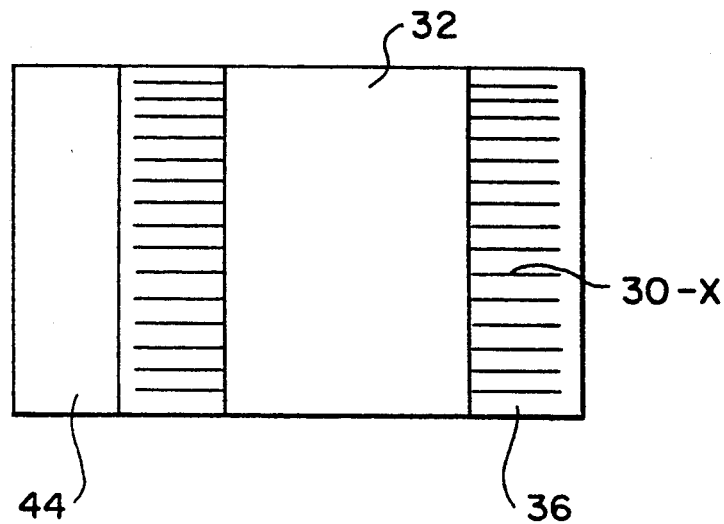
FIG. 6A is a sectional view along the line 6—6 of FIG. 4 showing the features of the guide strips.
Figure 6B:
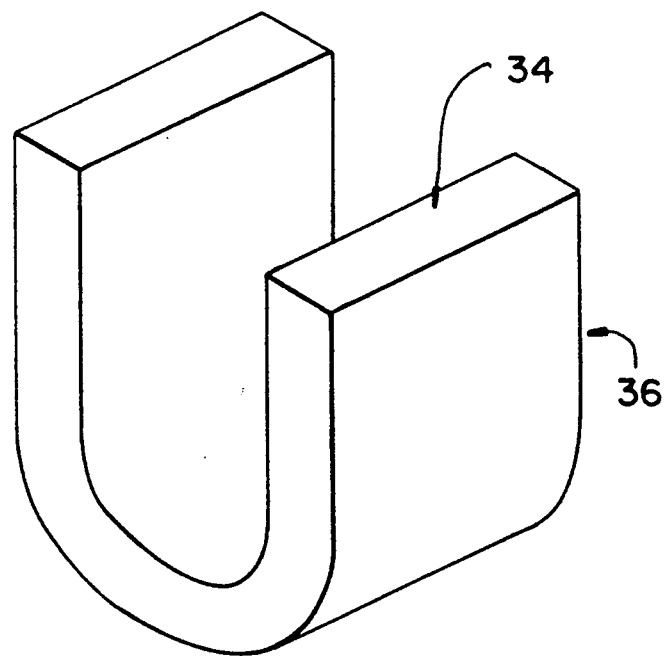
FIG. 6B is a perspective view showing a U-shaped part which is the major part of the pan of the machine in accordance with the present invention.

FIG. 6A shows a view along line 6—6 of FIG. 4 showing take-out portion 44, pan 36, one of the guide strips denoted 30-x and endless belt 32. FIG. 6B shows the pan 36 in a perspective view, including edible oil 34 inside the pan 36.

We claim:

1. A compact food cooking machine comprising:
   an endless belt rotatably mounted for carrying food items;
   means for driving said endless belt;
   a plurality of guiding elements spaced along the longitudinal length of the belt for holding a food item, each guiding element projecting from said belt and having a first end rigidly fixed to said endless belt, and a second end of each guiding element having a projection portion disposed at an angle from a surface of the guiding element to retain the food item, each guiding element comprising a plurality of parallel slats spaced adjacent to each other along a width of the belt, an end of each parallel slat forming said projection portion;
   a vertically-oriented U-shaped pan having a vertical dimension substantially greater than horizontal dimensions thereof for holding a heated liquid in which at least a lower part of said endless belt is immersed;
   a feeding position for placing the food item on said endless belt juxtaposed to one side of said pan;
   an unloading position directly above said feeding position for taking out the food item after said food item has been carried through the heated liquid by said endless belt; and
   a guide member projecting and sloping upwardly at the unloading position into a path where the guiding elements pass through, said guide member allowing the slats of the guiding elements to pass therethrough in a intermeshing relationship but retaining and guiding the food item to the unloading position.

2. A compact food cooking machine as in claim 1, wherein the surface of each of the guiding elements is at an acute angle with respect to a direction of rotation of the belt.

* * * * *